(12) United States Patent
Gabl et al.

(10) Patent No.: US 7,296,682 B2
(45) Date of Patent: Nov. 20, 2007

(54) PROCESS FOR CONTROLLING OPERATION OF A FLOTATION CELL

(75) Inventors: Helmuth Gabl, Graz (AT); Andreas Gorton-Hülgerth, Graz (AT); Erwin Hertl, Judendorf (AT)

(73) Assignee: Andritz AG, Graz (AT)

( * ) Notice: Subject to any disclaimer, the term of this patent is extended or adjusted under 35 U.S.C. 154(b) by 328 days.

(21) Appl. No.: 10/796,679

(22) Filed: Mar. 9, 2004

(65) Prior Publication Data

US 2004/0200778 A1 Oct. 14, 2004

(30) Foreign Application Priority Data

Mar. 11, 2003 (AT) ................ A 372/2003

(51) Int. Cl.
*B03D 1/24* (2006.01)
*B03D 1/14* (2006.01)
*D21C 5/02* (2006.01)

(52) U.S. Cl. .......................... 209/164; 209/1; 209/170; 162/4

(58) Field of Classification Search ..................... 209/1, 209/164, 170; 162/4
See application file for complete search history.

(56) References Cited

U.S. PATENT DOCUMENTS 3,551,897 A * 12/1970 Cooper ..................... 700/36
5,062,964 A * 11/1991 Ortner et al. ............... 210/740

FOREIGN PATENT DOCUMENTS

CA 1015869 * 8/1977
DE 4429277 * 2/1996

* cited by examiner

*Primary Examiner*—Thomas M. Lithgow
(74) *Attorney, Agent, or Firm*—Alix, Yale & Ristas, LLP

(57) ABSTRACT

A method for controlling operation of a flotation cell, where the liquid level and the foam level in the cell are measured and controlled. The method includes measuring at least one quality characteristic of the accept leaving the cell and determining the set value(s) for the liquid level and/or the foam level on the basis of the measured quality characteristic. The method is particularly suitable for flotation of a pulp suspension, particularly in deinking flotation.

16 Claims, 2 Drawing Sheets

PROCESS FOR CONTROLLING OPERATION OF A FLOTATION CELL

BACKGROUND OF THE INVENTION

This invention relates generally to processes for aerating suspensions. More particularly, the present invention relates to processes for flotating suspensions.

It is known that operation of a flotation cell can be controlled by means of the liquid level in the flotation cell, the amount of foam overflowing, and the throughput, where the throughput is pre-defined by the required production level.

Known control systems have the disadvantage that they are relatively inflexible. In particular, it is difficult with the control systems known to achieve a favorable compromise between the quality of the accept leaving the cell on the one hand and the energy input and loss of potentially recyclable materials on the other.

DE 42 25 117 C1 presents a control system in which, among other things, the foam back-up height in the foam channel of a primary flotation cell is measured and the amount of accept leaving the primary cell controlled on the basis of this measurement, thus the back-up height in the foam channel of the primary flotation cell remains constant. According to a similar principle the proportion of backfeed to the primary cell is also controlled in the secondary cell, based on the level height in the foam channel to the secondary cell.

This process, however, also does not provide a more flexible means of controlling operation in a flotation cell.

The problems with the state-of-the-art processes also occur in flotation of pulp suspensions, particularly in deinking flotation.

Deinking flotation is a process for removing contaminants and printing ink particles from pulp suspensions, particularly those produced in waste paper treatment. In this process, hydrophobic solids, such as printing ink particles or stickies, are brought into contact with gas bubbles in a suitable flotation cell. The solids adhering to them are carried to the surface of the liquid along with the gas bubbles and can be removed there as foam. Since the pulp is hydrophilic, it is discharged together with the accept. As there is no 100% separation of fibers and ink particles or stickies, there is a direct relation here between the losses and the cleaning effect achieved.

SUMMARY OF THE INVENTION

The task set by the present invention is to make a process available that overcomes the disadvantages of the processes already known for controlling operation of a flotation cell and provides a more flexible means of control.

In the process according to the invention for controlling operation of a flotation cell, the liquid level and the foam level in the cell are measured and controlled. The process is characterized by at least one quality characteristic of the accept leaving the cell being measured and the set value(s) for the liquid level and/or the foam level being determined on the basis of this quality characteristic.

Thus, unlike the state-of-the-art processes already known, operation of the flotation cell is controlled on the basis of the quality of the accept leaving the cell.

This makes the control system more flexible and maintains the process at an optimum in terms of energy consumption and loss of valuable resources.

The preferred quality characteristic measured should belong to the category containing brightness, whiteness, color type, number of dirt specks and/or number of stickies in the accept.

The liquid level in the cell is controlled by an outlet valve.

The foam level in the cell is controlled by the amount of air added. If a self-priming nozzle is used, this can be achieved by varying the amount of liquid. If the air is blown in, the foam level can be set by regulating the amount of air directly. By targeted variation of the air quantity, the operating point can be optimised in terms of cleanliness, energy consumption, and loss of valuable resources, as well as in terms of fibre loss and ash removal in deinking flotation, for example.

Here, the following parameters influence the flotation result:

Foam level above liquid: A high foam level means less fibre loss and higher foam consistency, but also higher energy consumption in adding the amount of air required.

Foam height above the weir of the flotation cell: This value is proportional to the amount of foam overflowing. A large overflow is a sign of good cleaning efficiency, but also high losses.

These two parameters can be controlled independently of one another by means of the liquid level in the cell.

A further parameter is the bubble size: The bubble size influences the speed at which the bubbles rise and also the potential contact surface area. Thus, flotation can be set selectively to the size of the particles to be removed.

A preferred configuration of the process according to the invention is characterized by the flotation cell comprising several sub-cells. Here, the foam level can be measured in each of the sub-cells, or the foam level is only measured in one sub-cell or only in one part of the sub-cells.

The process according to the invention can be implemented in a primary flotation cell, but also in a secondary flotation cell.

The present invention also relates to use of the process according to the invention in flotation of a pulp suspension, particularly in deinking flotation.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
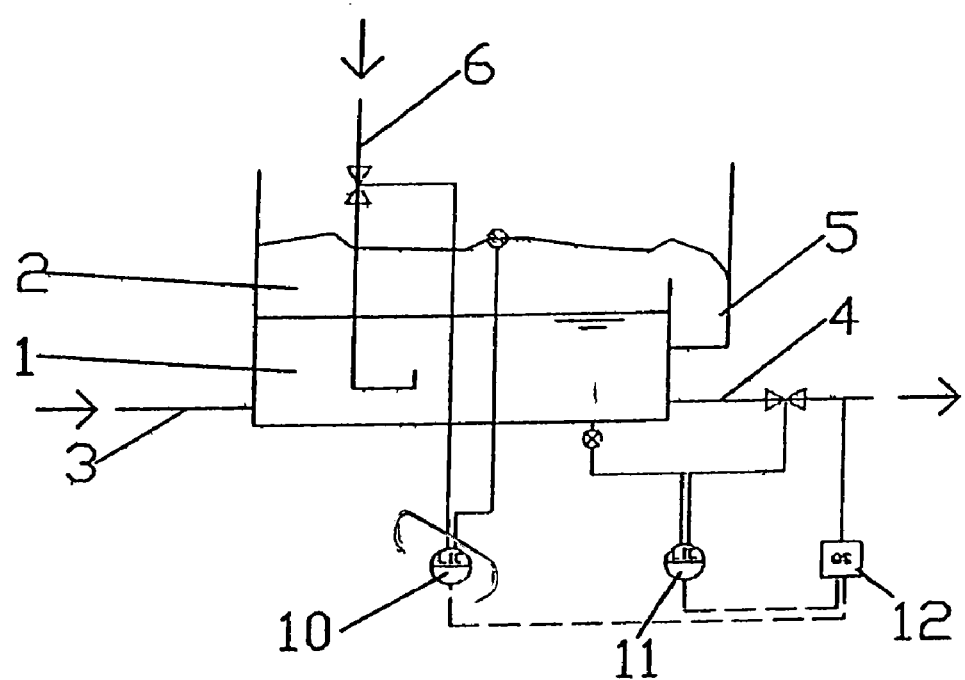
FIG. 1 is a schematic diagram of a first embodiment of the invention.

The illustration contains a diagram of the control system according to the present invention. The pulp for flotation flows through the inlet (3) into the liquid chamber (1). The air added through the air feed (6) generates the foam (2), which runs over a weir to the overflow (5). The foam (2) contains the pulp impurities, for example ink. The air can be added by means of compressors, self-priming nozzles, or similar. The cleaned liquid, or accept, leaves the plant through the outlet (4).

The liquid level is controlled via control loop (11) and the foam level via control loop (10). A quality metering system (12) measures at least one quality characteristic of the accept leaving the cell, for example brightness, dirt specks, or number of stickies. Generally, the quality characteristic that is measured depends on the application. In the subject method for controlling the operation of the cell, the measured value of the quality characteristic is used to determine the liquid level set value used by the liquid level control loop (11) and/or the foam level set value used by the foam level control loop (10).

The liquid chamber (1) may be divided into a number of sub-chambers, defining multiple sub-cells. In this variation, the foam level in each sub-cell may be measured, the foam level in only one of the sub-cells may be measured, or the foam level in a limited number of the sub-cells may be measured.

Figure 2:
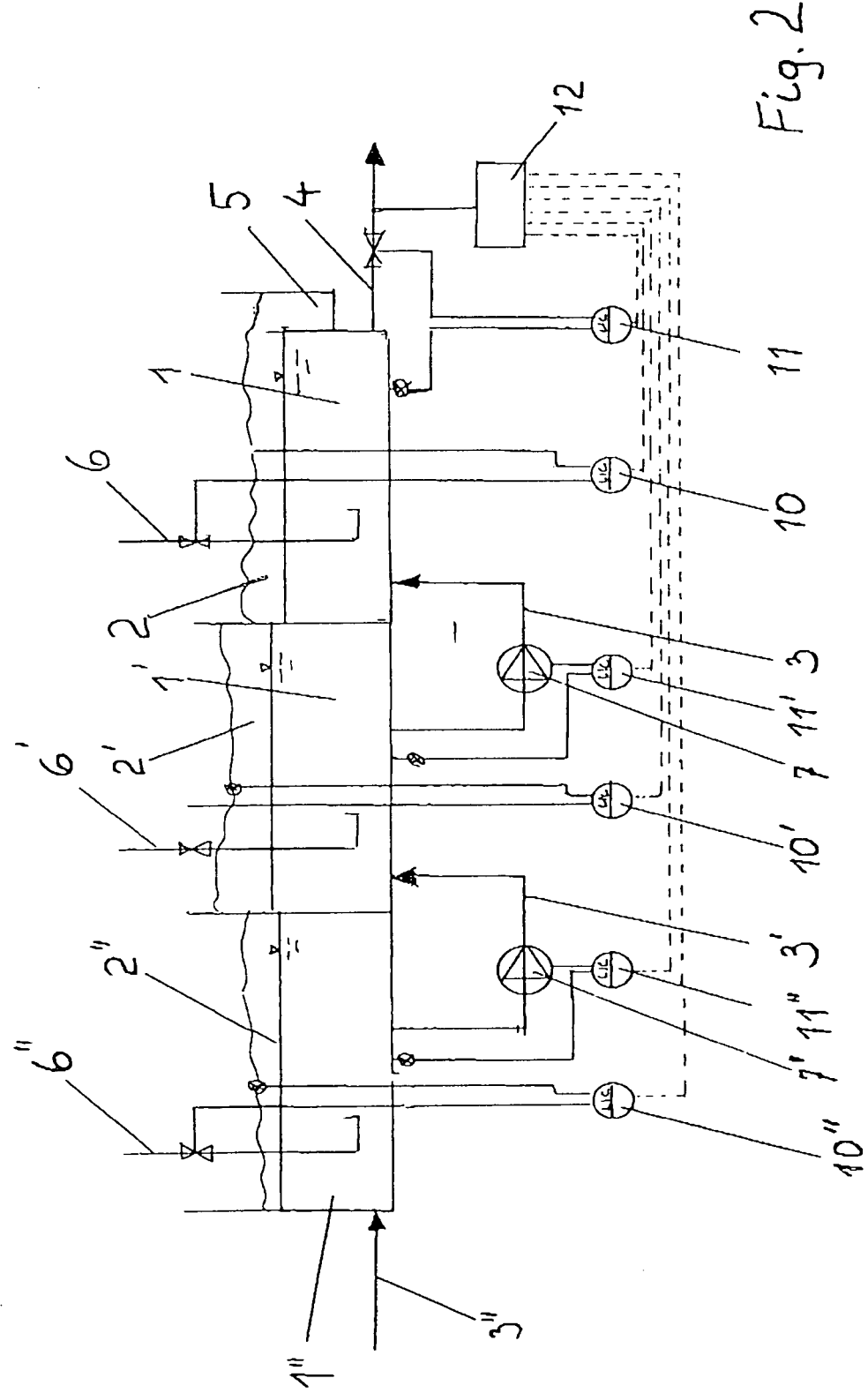
FIG. 2 is a schematic diagram of a second embodiment of the invention.

The liquid chamber may be divided into a number of sub-chambers 1, 1', 1", defining multiple sub-cells (see FIG. 2). In this variation, the level of foam 2, 2', 2" in each sub-cell may be measured. Alternatively, the foam level in only one or a limited number of sub-cells may be measured.

Each sub-cell has its own control loop 11, 11', 11" for the liquid level and its own control loop 10, 10', 10" for the foam level.

The flow of the liquid from one sub-cell to the next may be achieved by a pump 7, 7' in feed lines 3, 3', which is part of the control loop 11, 11', 11" for the liquid level. Alternatively, valves may be used for the flow control.

The quality metering system 12 is connected to the control loops 10, 10', 10" for the liquid level control and the control loops 11, 11', 11" for the foam level control to achieve optimum separation quality.

Many flotation processes employ multiple flotation cells, with some of the cells being used as primary cells and some of the cells being used as secondary cells. It should be appreciated that in such processes, the above-disclosed method may be used in one or more of the primary cells, only, in one or more of the secondary cells, only.

What is claimed is:

1. A method for controlling operation of a flotation cell receiving a pulp suspension having impurities and discharging a pulp suspension accept and a foam having the impurities, the cell comprising a plurality of sub-cells and having a liquid level controller measuring and controlling the cell liquid level and a foam level controller measuring the foam level in one sub-cell or only in one part of the sub-cells and controlling the cell foam level, the method comprising the steps of:
   measuring at least one quality characteristic of the pulp suspension accept discharged from the cell;
   setting a value for the cell foam level within the foam level controller, the value of the cell foam level being determined by the measured value of the at least one quality characteristic; and
   varying a flow of a liquid through a self-priming nozzle to control the cell foam level.

2. The method of claim 1 wherein the quality characteristic is selected from brightness, whiteness, color type, number of dirt specks and number of stickies in the accept.

3. The method of claim 1 wherein the liquid level and foam level are measured and controlled in one sub-cell or only in one part of the sub-cells.

4. The method of claim 1 wherein the liquid level is measured in one sub-cell or only in one part of the sub-cells.

5. The method of claim 4 wherein the liquid level is controlled in one sub-cell or only in one part of the sub-cells.

6. The method of claim 1 wherein the method is implemented in a primary flotation cell.

7. The method of claim 1 wherein the method is implemented in a secondary flotation cell.

8. The method of claim 1 wherein the suspension is a pulp suspension and the foam contains ink removed from the pulp suspension.

9. The method of claim 1 further comprising the step of setting a value for the cell liquid level within the liquid level controller, the value of the cell liquid level be determined by the measured value of the at least one quality characteristic.

10. A method for controlling operation of a flotation cell receiving a pulp suspension having impurities and discharging a pulp suspension accept and a foam having the impurities, the cell comprising a plurality of sub-cells and having a liquid level controller measuring and controlling the cell liquid level and a foam level controller measuring the foam level in one sub-cell or only in one part of the sub-cells and controlling the cell foam level, the method comprising the steps of:
    measuring at least one quality characteristic of the pulp suspension accept discharged from the cell;
    setting a value for the cell foam level within the foam level controller, the value of the cell foam level being determined by the measured value of the at least one quality characteristic; setting a value for the cell liquid level within the liquid level controller, the value of the cell liquid level be determined by the measured value of the at least one quality characteristic; and
    varying a flow of a liquid through a self-priming nozzle to control the cell foam level.

11. A method for controlling operation of a flotation cell receiving a pulp suspension having impurities and discharging a pulp suspension accept and a foam having the impurities, the cell comprising a plurality of sub-cells and having a liquid level controller measuring and controlling the cell liquid level and a foam level controller measuring the foam level in one sub-cell or only in one part of the sub-cells and controlling the cell foam level, the method comprising the steps of:
    measuring at least one quality characteristic of the pulp suspension accept discharged from the cell;
    setting a value for the cell foam level within the foam level controller or setting a value for the cell liquid level within the liquid level controller, the value of the level being determined by the measured value of the at least one quality characteristic; and
    varying a flow of a liquid through a self-priming nozzle to control the cell foam level.

12. The method of claim 1 wherein the foam level is controlled in each of the sub-cells.

13. The method of claim 1 wherein the foam level is controlled in one sub-cell or only in one part of the sub-cells.

14. The method of claim 1 wherein the liquid level is measured in each of the sub-cells.

15. The method of claim 14 wherein the liquid level is controlled in each of the sub-cells.

16. The method of claim 1 wherein the liquid level and foam level are measured and controlled in each of the sub-cells.

* * * * *